(12) United States Patent
Pellenc et al.

(10) Patent No.: US 10,124,370 B2
(45) Date of Patent: Nov. 13, 2018

(54) SORTING TABLE WITH SORTER ROLLS FOR ELIMINATION OF FOREIGN MATTER REMAINING MIXED IN A HARVEST OF SMALL FRUIT

(71) Applicants: Roger Pellenc, Pertuis (FR); Jean-Marc Gialis, Cheval Blanc (FR)

(72) Inventors: Roger Pellenc, Pertuis (FR); Jean-Marc Gialis, Cheval Blanc (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 0 days.

(21) Appl. No.: 14/588,692

(22) Filed: Jan. 2, 2015

(65) Prior Publication Data
US 2015/0183002 A1    Jul. 2, 2015

Related U.S. Application Data

(63) Continuation of application No. 12/199,732, filed on Aug. 27, 2008, now abandoned.

(30) Foreign Application Priority Data

Aug. 30, 2007    (FR) .................................. 07 06085

(51) Int. Cl.
*B07B 1/15*    (2006.01)
*A01D 46/28*    (2006.01)
(Continued)

(52) U.S. Cl.
CPC .............. *B07B 1/15* (2013.01); *A01D 46/285* (2013.01); *A23N 12/005* (2013.01); *A23N 15/02* (2013.01); *C12G 1/005* (2013.01); *Y02A 40/922* (2018.01)

(58) Field of Classification Search
CPC ........................................................ B07B 1/15
(Continued)

(56) References Cited

U.S. PATENT DOCUMENTS 1,867,522 A * 7/1932 Noffsinger .............. B07B 13/00
198/779
3,804,256 A    4/1974 Marriott et al.
(Continued)

FOREIGN PATENT DOCUMENTS

DE    1965243 A1    8/1971
EP    0951950 A1    10/1999

*Primary Examiner* — Minh Truong
*Assistant Examiner* — Michael E Butler
(74) *Attorney, Agent, or Firm* — Egbert Law Offices, PLLC

(57) ABSTRACT

Sorting table with sorter rolls eliminates foreign matter remaining mixed in with the products of the harvest of small fruit. The sorting table features a sorting system constituted by a succession of rotating rolls of cylindrical shape arranged in parallel so as to form a mobile sorting plane, and a locomotion device, allowing the rotating drive of the rolls in the same direction, so as to allow transporting the grapes dumped on the upstream part of this sorting plane, in a direction that is perpendicular to the axis of the rotating cylindrical rolls and over the entire length of the sorting plane. The rotating cylindrical rolls allow the passage and drop-off of only the small fruit to be sorted, whereas the foreign matter of a size larger than that of the latter remains on the surface of the mobile sorting plane and is evacuated at the downstream end.

10 Claims, 13 Drawing Sheets

(51) Int. Cl.
  *A23N 12/00*  (2006.01)
  *A23N 15/02*  (2006.01)
  *C12G 1/00*  (2006.01)

(58) Field of Classification Search
  USPC ............... 209/667, 668, 671, 672, 673, 674
  See application file for complete search history.

(56) References Cited

U.S. PATENT DOCUMENTS

| | | |
|---|---|---|
| 3,837,487 A | 9/1974 | Sherwood |
| 4,609,110 A | 9/1986 | Schulman et al. |
| 5,051,172 A | 9/1991 | Gilmore |
| 5,060,806 A | 10/1991 | Savage |
| 5,335,051 A | 8/1994 | Tani |
| 5,590,792 A | 1/1997 | Kobayashi |
| 5,740,922 A | 4/1998 | Williams |
| 5,806,686 A * | 9/1998 | Ecker .................... A23N 15/00 198/663 |
| 6,250,478 B1 | 6/2001 | Davis |
| 6,659,287 B1 | 12/2003 | Hawkins |
| 6,843,376 B2 | 1/2005 | Dube et al. |
| 8,646,615 B2 * | 2/2014 | Bruggencate et al. ....... 209/667 |
| 2004/0035764 A1 | 2/2004 | Kreft et al. |
| 2007/0000823 A1 | 1/2007 | Greenbank et al. |
| 2010/0096301 A1 * | 4/2010 | Nyborg et al. ............... 209/667 |
| 2010/0219111 A1 * | 9/2010 | Brasseur ....................... 209/672 |
| 2012/0131894 A1 * | 5/2012 | Pellenc et al. ............... 56/328.1 |
| 2013/0277284 A1 * | 10/2013 | Jones et al. ................... 209/587 |
| 2014/0048459 A1 * | 2/2014 | Hufford et al. ............... 209/674 |

* cited by examiner

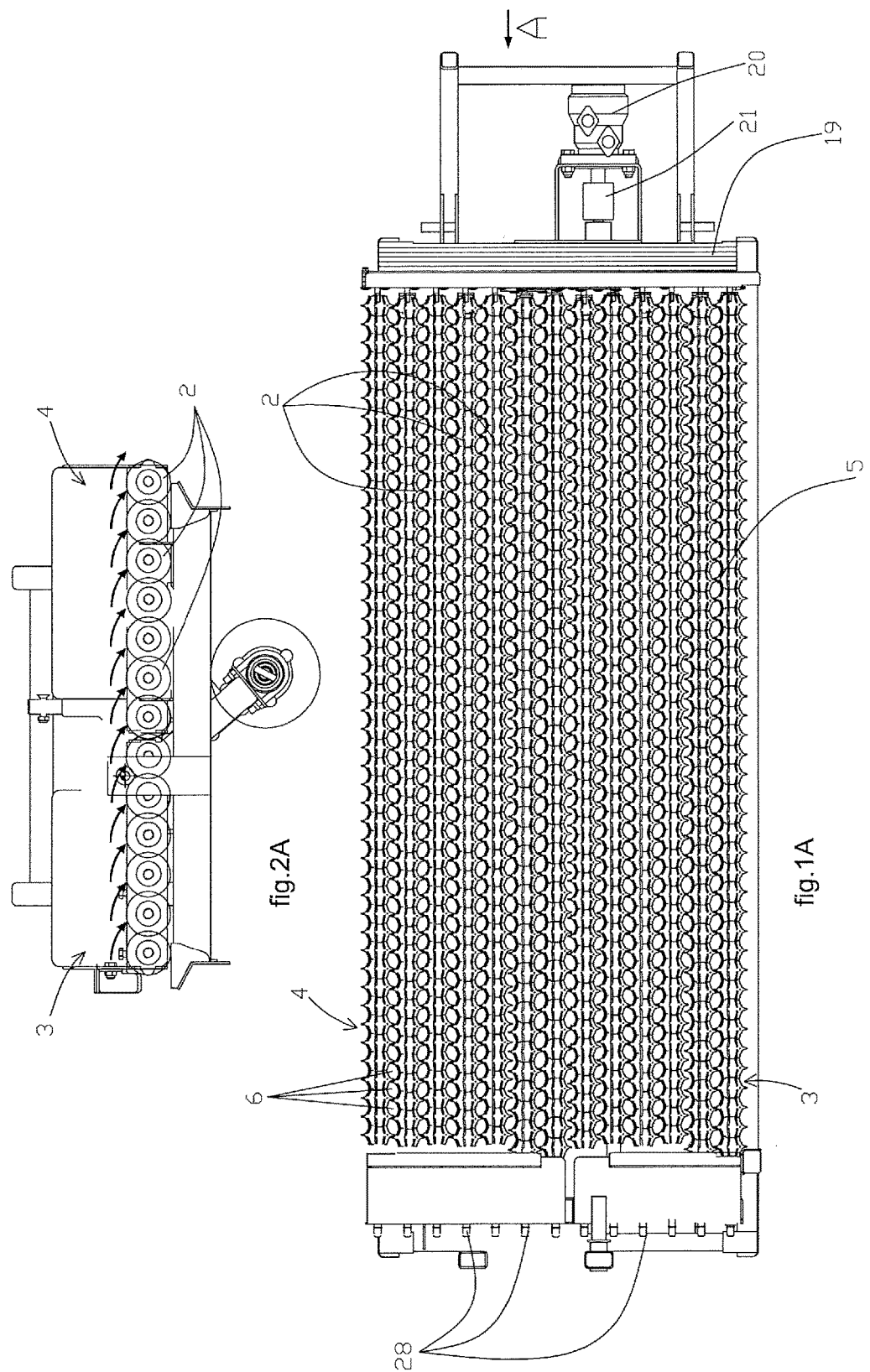

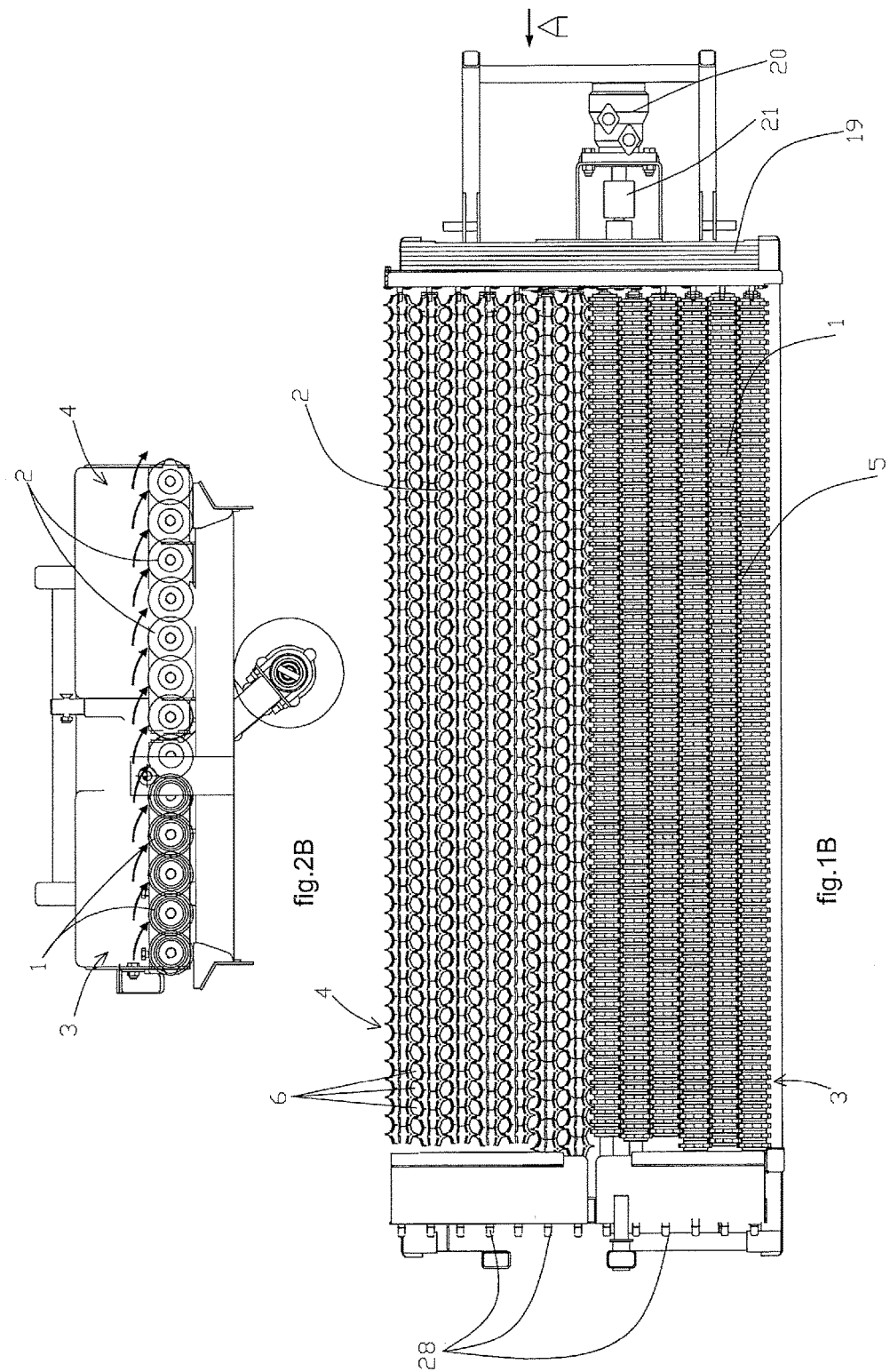

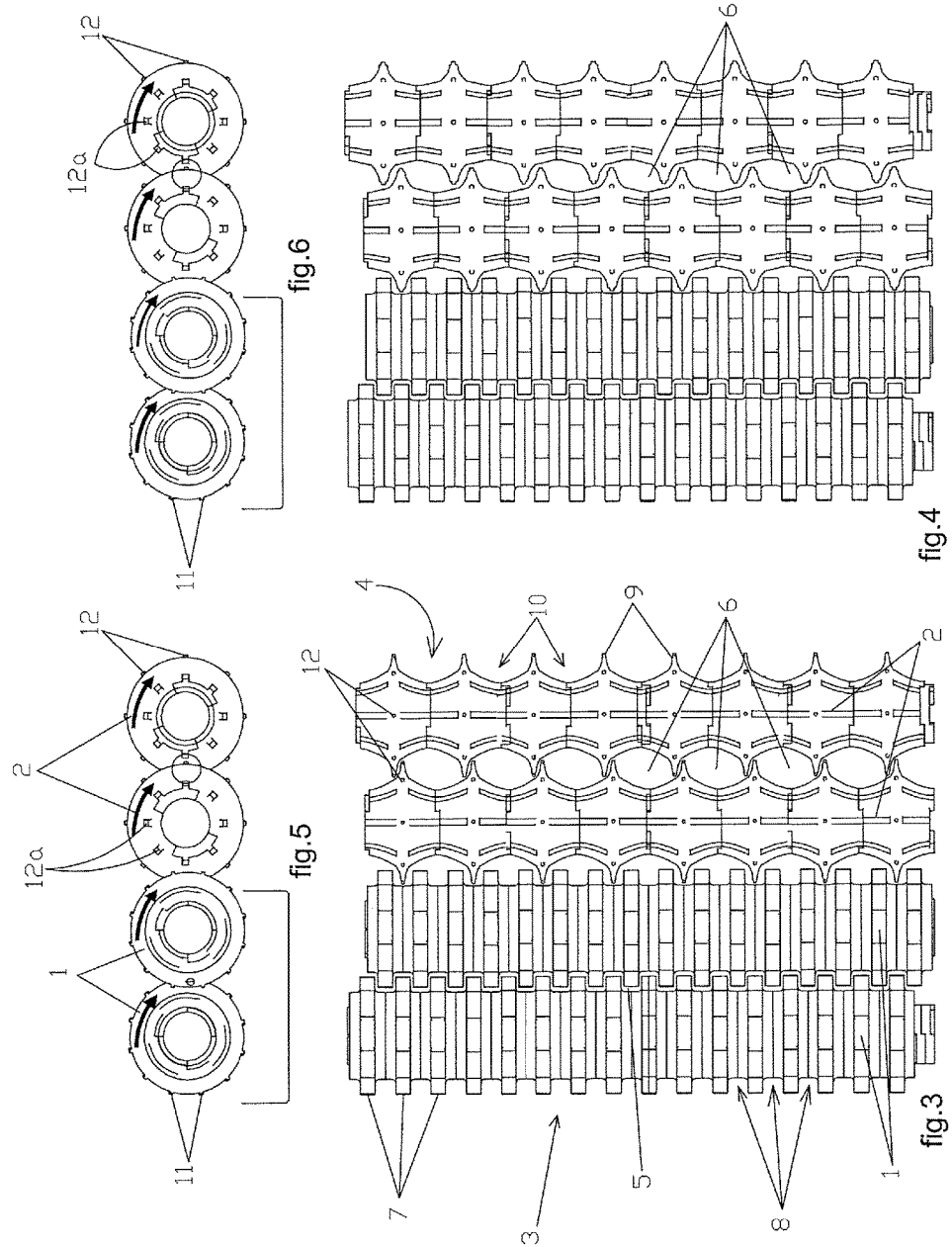

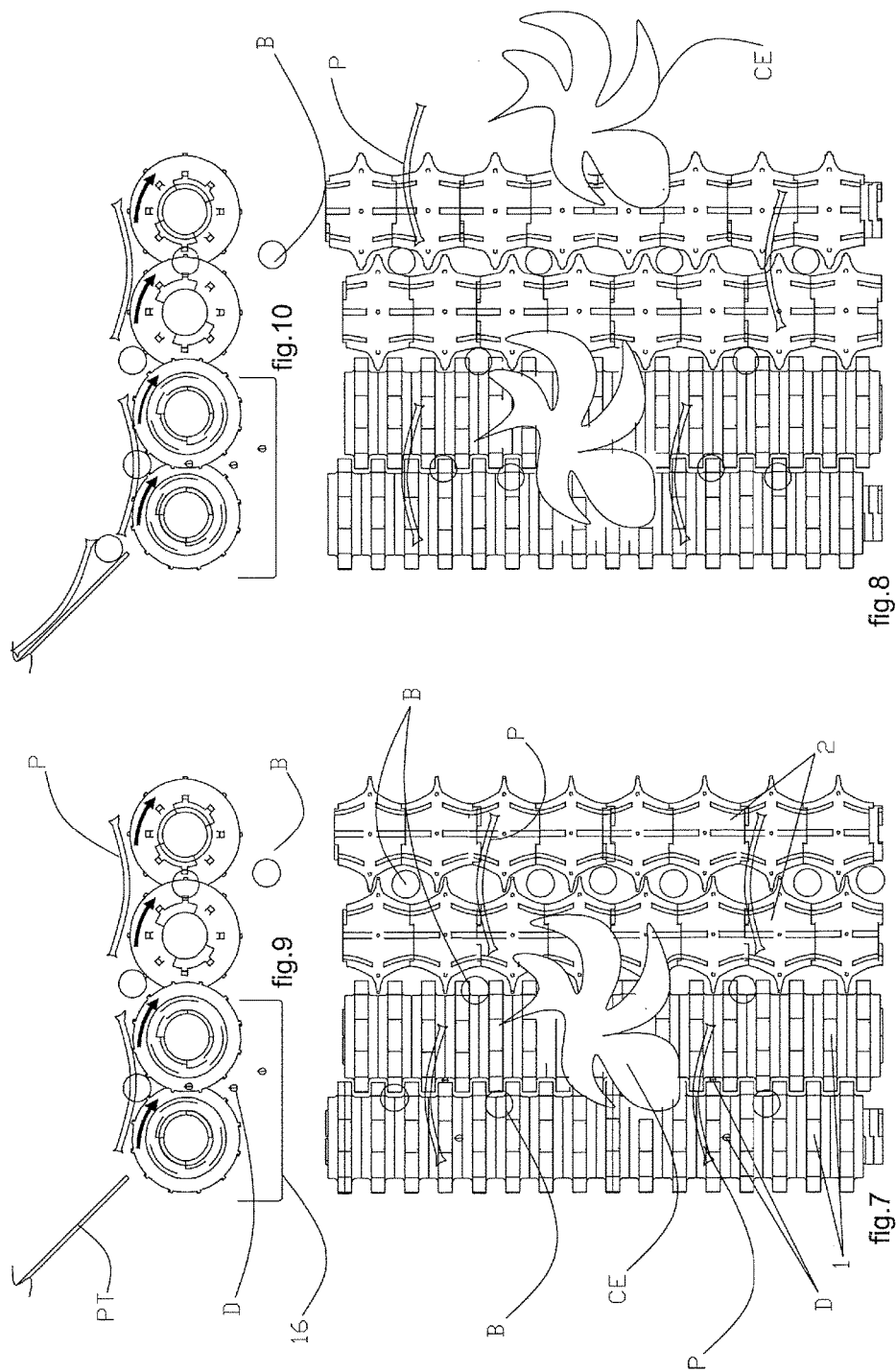

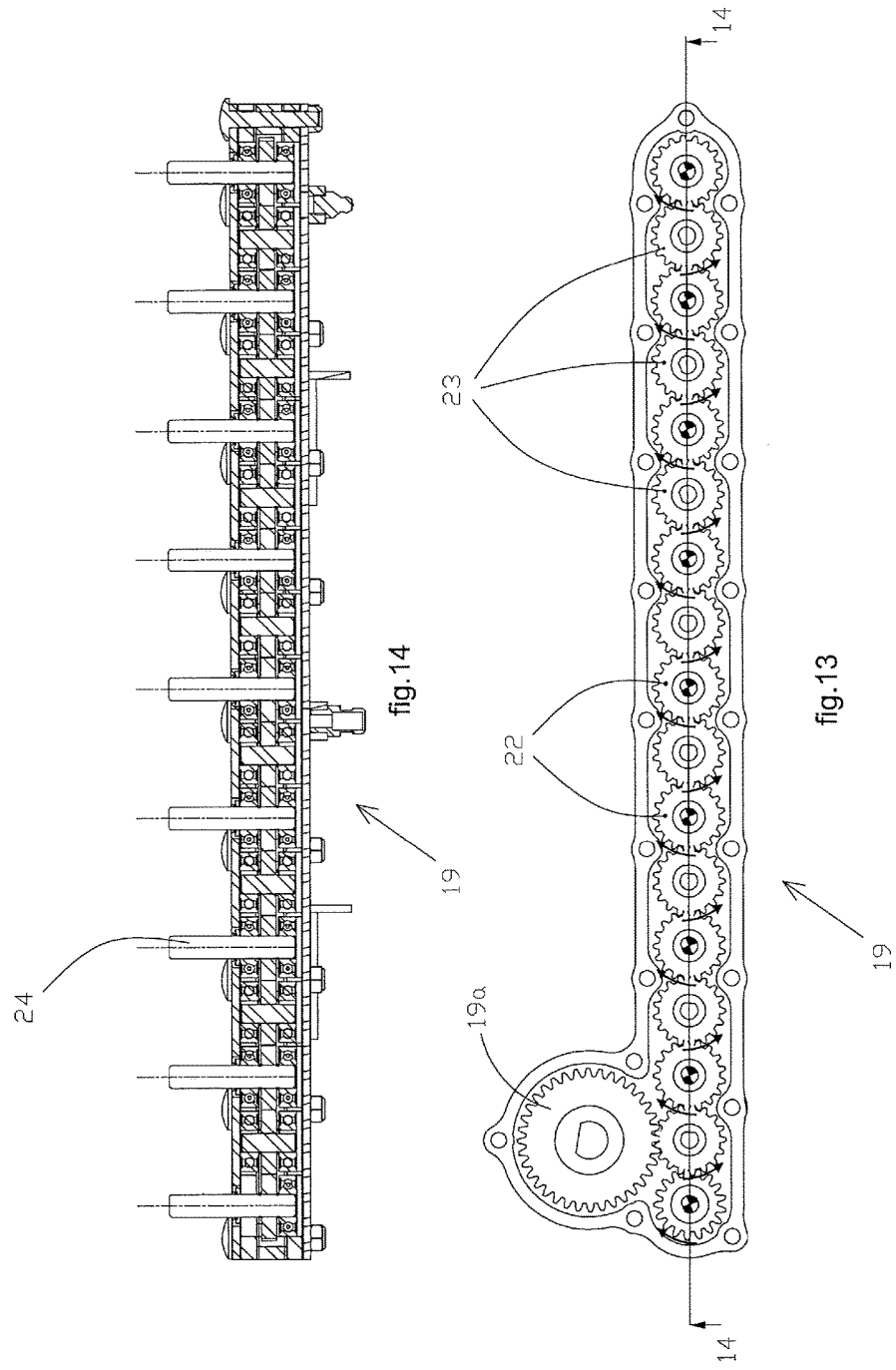

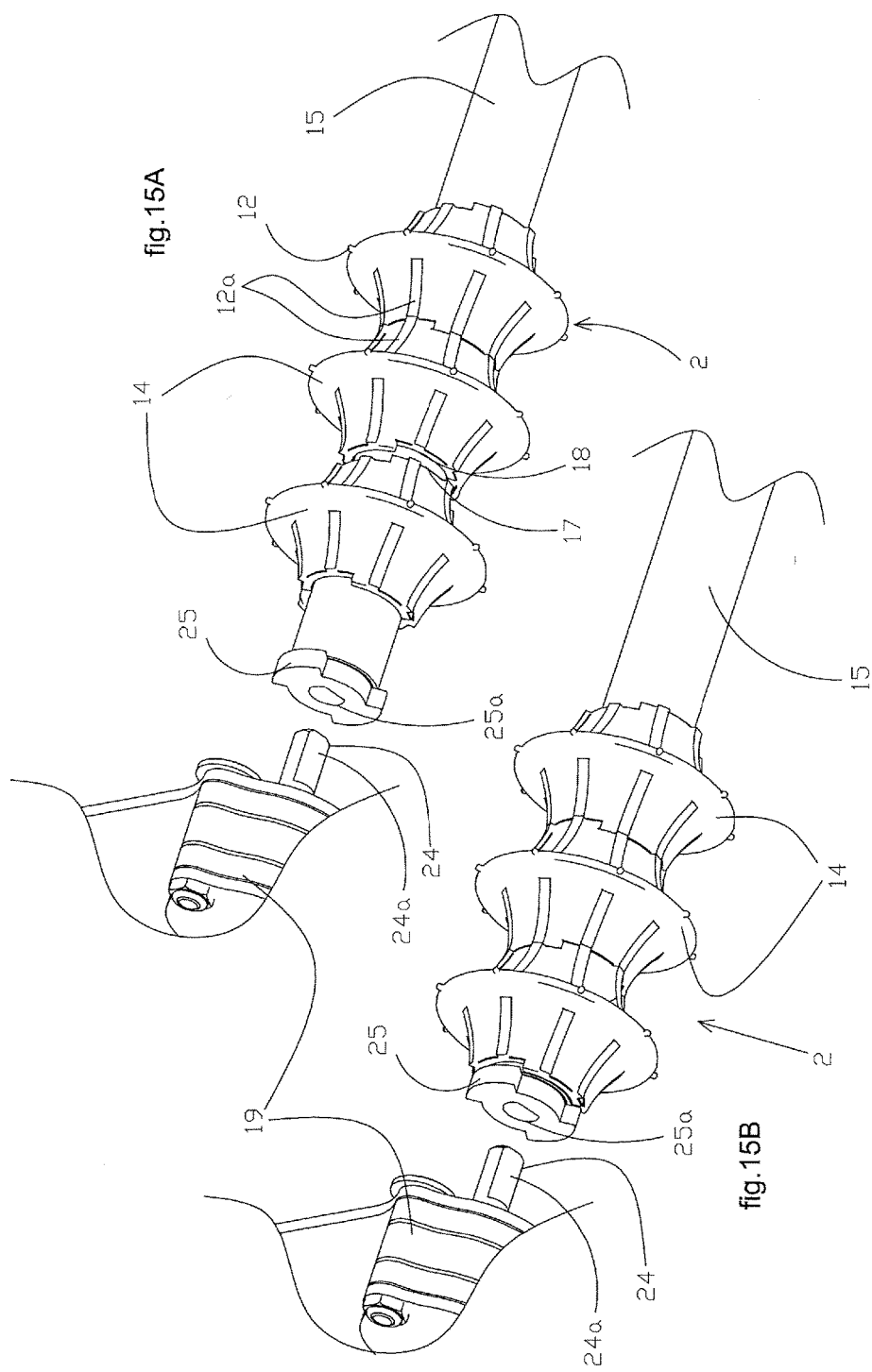

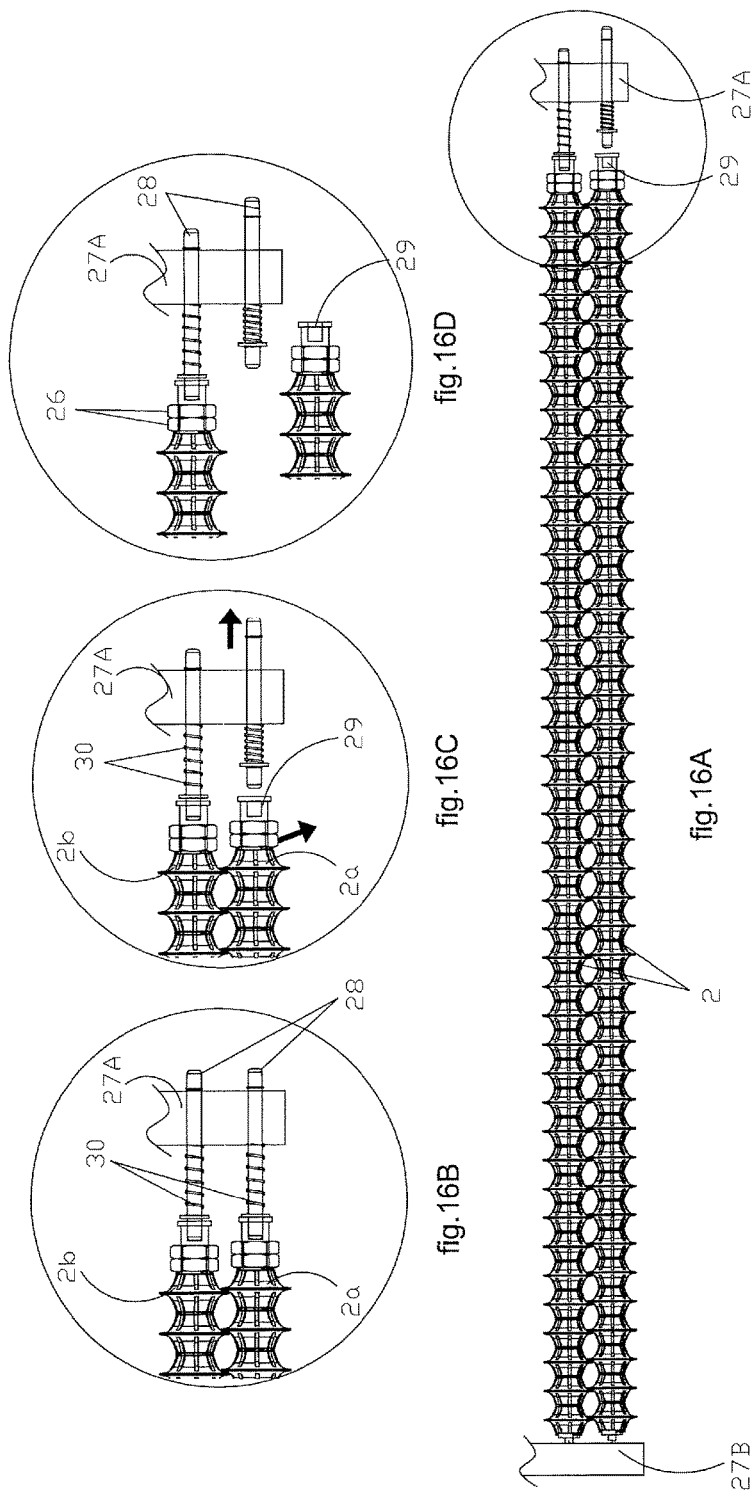

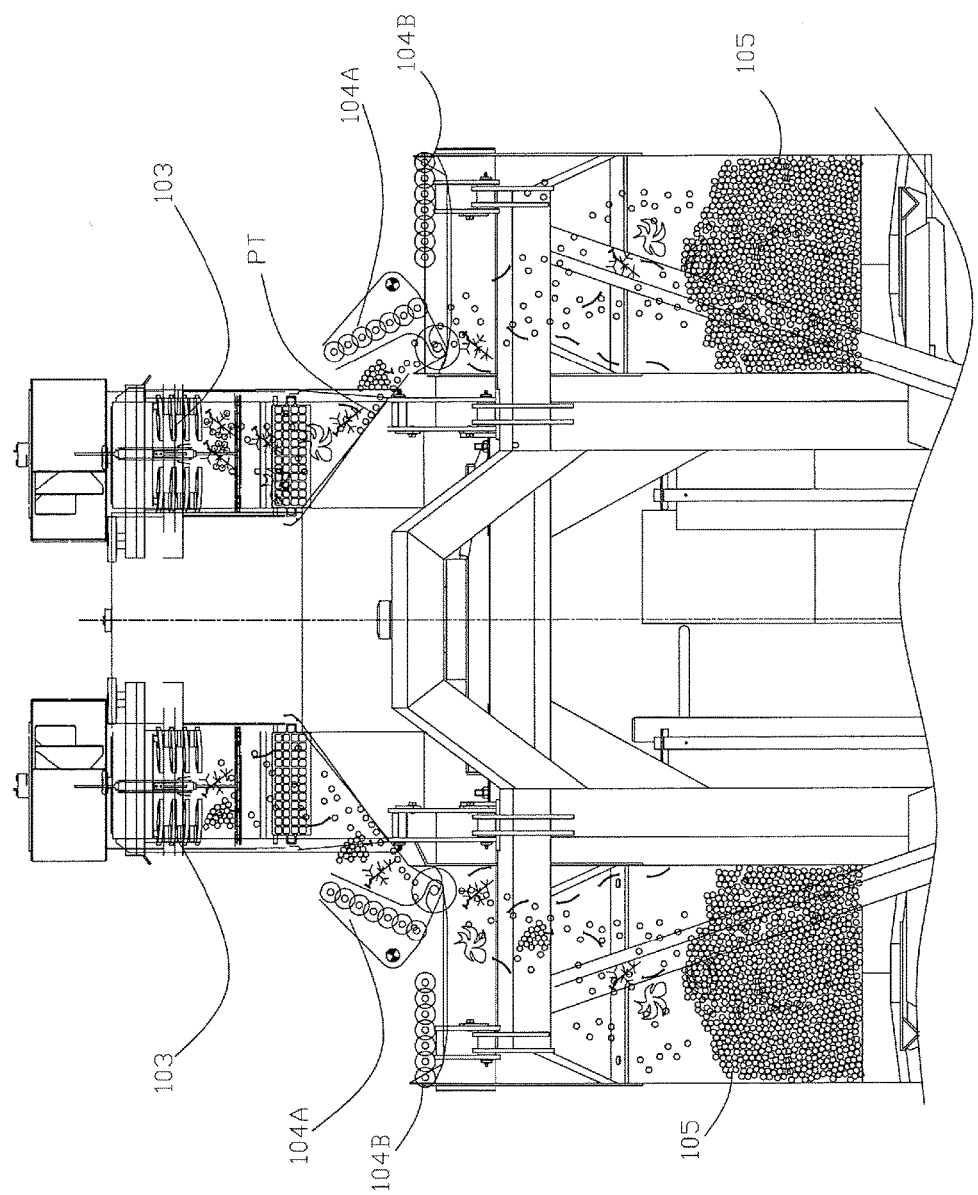

SORTING TABLE WITH SORTER ROLLS FOR ELIMINATION OF FOREIGN MATTER REMAINING MIXED IN A HARVEST OF SMALL FRUIT

CROSS-REFERENCE TO RELATED U.S. APPLICATIONS

The present application is a continuation of U.S. patent application Ser. No. 12/199,732, filed on Aug. 27, 2008, and entitled "Sorting Table with Sorter Rolls for Elimination of Foreign Matter Remaining Mixed in a Harvest of Small Fruit", presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a sorting table with sorter rolls for the elimination of foreign matter remaining mixed in with the products of the harvest of small fruit. It applies as well to harvesting machines, and in particular to grape-picking machines equipped with one or several sorting tables with sorter rolls.

According to a particularly interesting application, the sorting table with sorter rolls according to the invention is intended to ensure the elimination of foreign matter (leaf stalks, leaves, pieces of leaves or tendrils, splinters of posts or stakes, mineral debris, insects, small animals, etc. . . . ) remaining mixed in with grapes, after the de-stalking of the crop.

However, this advantageous application is not limited to a sorting table for grapes. According to the invention, the sorting table may also be used for extracting foreign matter from the products of the harvest of various small fruits, such as red currants, black currants, blackberries, raspberries, bilberries, cranberries, olives, etc.

Considering the particularly interesting application envisaged for the processing of grapes, the invention is nevertheless described hereafter in relation to this application.

2. Description of Related Art Including Information Disclosed Under 37 CFR 1.97 and 37 CFR 1.98

With the majority of applications of wine-making methods, grapes are first de-stalked prior to masking and/or pressing of the grapes. This de-stalking operation, which is performed by different methods and mechanical devices, is meant to detach the berries from the bunch of grapes and to separate said berries from the stalks to which they are still attached after the harvest and to avoid the presence of bitterness and herbal and vegetable tastes in the wine.

However, after this de-stalking operation, whether this may or may not have been preceded by a cleaning operation of the crop, a certain percentage of debris and foreign matter remains mixed in with the grapes, so that a sorting operation is necessary to extract these, if one does not want the presence of such foreign matter to alter the qualities of the wine and in particular its organoleptic qualities.

This sorting operation can be performed manually or automatically on a sorting table that has been set up for one of the other of these sorting modes.

Linear sorting tables intended for manual sorting feature a support on which the crop is spread out and persons charged with the sorting task are positioned on either side of it. This support may be static in its most rustic form, but it is most often provided either with some movement so the crop that is spread out in a thin layer can travel past these persons for sorting, or it consists of an inclined vibrating tray. The conveyor belt or vibrating tray may be equipped with perforations to allow the layer of grapes being cleaned and moving towards the crop receiving container. This sorting method requires the search for and the availability of seasonal labor, and it requires them to pay close attention to the task, its productivity being very mediocre. Also, the results tend to be quite uneven. Of course, such sorting tables cannot be placed on grape-picking machines.

Automatic vibrating tables feature a table formed by a perforated tray which is subjected to vibrations allowing a spreading and movement of the grapes. The berries pass across the tray perforations during their travel and are recovered under said vibrating, for example in a grape pump. The pieces of vegetable debris which are larger than the perforations advance under the effect of the vibrations and are evacuated by gravity at the downstream end of the table.

These automatic vibrating tables present these particular drawbacks:

noisy operation;

low productivity requiring a strict control of the output of equipment positioned upstream of the sorting table (feeding device, de-stalker, etc.);

a rather imperfect result, keeping in mind that any debris of a size smaller than the berries can pass through the perforations of the tray and are therefore not evacuated; and cannot be placed on a grape-picking machine.

In a different agricultural domain, olive or nut picking machines are known to include a sorting system consisting of a succession of identical, parallel rolls that are close to each other, and provided with grooves and helicoidal threading extending from one end of the rolls to the other. In this way, the number of openings are arranged between two adjacent helicoidal rolls, these openings being sized so allow the passage and drop-off of the small harvested fruit, whereas the foreign matter of sizes larger than the size of the fruit "float" on the rolls and are evacuated to one of the side edges of the sorting surface.

The drawbacks of these devices and their operation method are that they lead to the crushing of a more than negligible percentage of the fruit, that they let leaf stalks, twigs and other debris of an elongated shape pass through, and that they cause a skewed displacement of the treated products, thus leaving an unused area of screening and creating a disturbance in the operation. Nor do these devices allow the elimination of foreign matter of a size that is smaller than the dimensions of the openings made between the rolls, so that the cleaning of the crop remains very imperfect. To remedy this drawback, it is necessary to have a screening device consisting of an endless conveyor with fixed close bars that are separated by small size slots allowing the evacuation, by gravity, of small sized debris during the ascending travel of the crop towards the sorting system. Such an arrangement considerably lengthens the sorting device and excludes any possibility of mounting it on a harvesting machine such as a grape-picker.

Still in a different agricultural domain (sizing of potatoes), machines are known (German Patent No. 1965243) which include a number of profiled cylinders positioned parallel to each other in succession, these cylinders being constituted each by coaxial discs presenting conical ridges, so that each profiled cylinder delimits, together with the adjacent cylinders, a number of adjustable openings. The ends of the profiled cylinders are hooked on endless chains, the upper run of which is essentially horizontal, the rolls being driven in rotation by means of a rack during their upper horizontal travel. The profiled cylinders are thus driven in translation.

These machines are thus designed in the form of an endless calibrating conveyor belt with an upper calibrating side and a lower return side which has these particular drawbacks:

they are bulky because of the need to install a container for the recovery of the sized products between the upper calibrating side and the return side of the endless conveyor belt; and they are complex and costly.

In the prior art document, European Patent 0951950, there is also described a potato sizing machine operating on the same principle and having the additional drawback of being more complex and more expensive.

Furthermore, the sizing machines for products such as potatoes, described in documents DE 1965243 and EP 0951950 cannot be used for the elimination of small foreign matter mixed in with the grape berries, after the de-stalking of the bunches of grapes. It becomes clear, in fact, that nothing has been provided to prevent any small foreign matter from passing through the openings in the endless calibrator conveyor belt, together with the sized products.

It is the particular aim of the invention to remedy these drawbacks or at least to significantly improve the results obtained in the operation of the known machinery.

BRIEF SUMMARY OF THE INVENTION

The aforementioned objectives of the invention are achieved because of a sorting table of the present invention. The sorting table has a sorting system consisting of a succession of adjacent rotating sorter rolls of a generally cylindrical shape arranged in parallel so as to form a sorting plane, and means of locomotion allowing the rotating drive of said rolls in the same direction, so as to allow the grapes dumped on the upstream part of this sorting plane to be transported in a direction perpendicular to the axis of said rotating cylindrical rolls and over the entire length of said sorting plane. The rotating cylindrical rolls are arranged and located in such a manner as to provide a number of openings between two neighboring rotating cylindrical rolls and to allow only the passage and drop-off of the small fruit to be sorted whereas the foreign matter of a size larger than the latter remains on the surface of the mobile sorting plane and is evacuated at the downstream end of the latter. This sorting table is remarkable in that said rotating cylindrical rolls are immobilized in translation.

According to another characteristic arrangement, the sorter rolls present a succession of circular reliefs separated by circular grooves. These circular reliefs feature a median circular crest or ridge joining together at the root of the grooves by a concave, preferably arc-shaped surface. The rolls are so positioned that the circular grooves of these rolls form, together with the circular grooves of the adjacent roll or rolls, a number of sized openings to allow the passage of the fruit to be sorted.

According to an advantageous mode of execution, the circular reliefs of each sorter roll are slightly offset in relation to the circular reliefs of the adjacent roll or rolls and their adjacent edges are partially engaged in the grooves of the adjacent roll or rolls, so as to define the openings for passage of the berries.

According to another advantageous mode of production, the circular reliefs of the sorter rolls are peripherally provided with stubs, notches or humps that are angularly spaced.

According to another interesting mode of execution, the circular grooves are provided with angularly spaced flutes.

According to another important characteristic arrangement of the invention, the sorting system also features a succession of rotating feeder cleaner rolls of cylindrical shape that are positioned in parallel upstream of the sorter rolls. These feeder cleaner rolls are driven in rotation in the same direction as said sorter rolls and feature a succession of circular reliefs separated by circular grooves. These rotating feeder cleaner rolls are immobilized in translation and so positioned that their circular reliefs are imbricated in the grooves of the adjacent roll or rolls, with a gap or play or reduced size being fitted between the interpenetrating parts of the adjacent rolls. This gap represents a size in the order of 2 to 3 mm, so as to let pass only the debris or waste of very small size (pips, pieces of leaves or grape stalks, small mineral or plant debris, etc.). On the other hand, these feeder cleaner rolls allow positioning sprigs, twigs and other debris of elongated shape to perpendicularly stay on said rolls, so that they can be transported, in this position, to the downstream end of the sorting table and cannot get stuck between the rolls.

According to another characteristic arrangement, the circular reliefs of the feeder cleaner rolls are provided peripherally with spaced stubs, notches or humps.

According to an advantageous way of carrying out the invention, the rolls of the sorting table are mounted in a detachable and interchangeable manner of the bearing structure of said table.

According to another characteristic, arrangement the circular reliefs and the circular grooves of the feeder cleaner rolls and/or the sorting rolls is formed by rollers that are successively threaded on a support rail, each roller having a circular relief and a half groove placed on each side of said circular relief so that the circular grooves are constituted by the junction of two neighboring rollers.

The sorting table according to the invention provides several interesting advantages, in particular:

simplicity of manufacture, of operation and maintenance;

remarkable cleaning quality of the crop;

substantially improved performance in comparison to that of devices offered to this day;

quiet operation;

the flow of the crop dumped on the upstream part of the sorting plane, over the entire length of the rolls, is moving perpendicularly to the axis of said rolls and foreign matter is ejected at the downstream end of the sorting table; and it can be put on a small fruit harvesting machine, in particular on a grape-picking machine, for example above the receiving bins installed on this type of machinery, or it can be used in the cave or any other crop processing venue.

According to a preferred way of carrying out the invention, the rollers constituting the rolls of the sorting table are mounted in a detachable and interchangeable way on their support rail.

According to another preferred way, the rollers are simply threaded on their support rail and are coupled in rotation to each other by means of notches and complementary arc-shaped lateral slots and immobilized in translation on said support rail by shimming means which push against the alignment ends of the rollers.

According to another characteristic arrangement the feeder cleaner rolls and/or the sorter rolls are detachable and interchangeable.

According to an advantageous way of execution, one of the ends of the support rails of the feeder cleaner rolls and the sorter rolls is mounted on one of the sides of the bearing structure of the sorting table, by means of a cylindrical axis, axially mobile and engaged, in a retractable manner, in an axial bore of said end, this retractable axis being subjected to the action of a spring tightening to keep it engaged in said bore.

In this way, it is possible to remove each roll easily and quickly, for instance in order to replace its cleaning and/or sorting rollers with rollers presenting characteristics of shape and/or size that are well adapted to the characteristics of stains, or of shapes and/or dimensions of small fruit to be sorted, or to replace it by a different complete roll. In this way, it is possible to adapt the shape and the dimensions of the openings in the sorting table depending on the size of the berries to be processed.

The invention also concerns the small-fruit picking machines and in particular the grape-picking machines including at least one sorting table featuring the aforementioned characteristic arrangements.

According to a preferred way of carrying out the invention applied to machines equipped with one or several crop receiving bins, the sorting machine is positioned above the upper opening of the bin or bins.

Advantageously the sorting table is mounted in a tiltable fashion, through the intermediary of one of its sides, on the receiving bin, in order to allow the emptying of the latter. According to another interesting example of application, the sorting table is made of two parts, like an upstream part and a downstream part, and one of these parts is tiltably mounted, so as to allow its retraction and to free the upper opening of the receiving bin, in situations where the vine-grower wishes to keep a certain volume of grape stalks and leaves with the grapes for vinification. In this case the grapes may not be destalked previously.

BRIEF DESCRIPTION OF THE SEVERAL VIEWS OF THE DRAWINGS

The above aims, characteristics and advantages and still others will become clearer from the following description and the attached drawings.

FIG. 1A is a schematic view of an outline sketch of a first example of producing the sorting table according to the invention.

FIG. 2A is a cross-sectional view seen along the arrow A shown in FIG. 1A.

FIG. 1B is a schematic view of an outline sketch of a second preferred example of producing the sorting table according to the invention.

FIG. 2B is a cross-sectional view seen along the arrow A of FIG. 1B.

FIGS. 3 and 4 are two partial schematic views in outline and at an enlarged scale, of the sorting table shown in FIGS. 1B and 2B.

FIGS. 5 and 6 are side schematic views of FIGS. 3 and 4 respectively.

FIGS. 7 to 10 are corresponding schematic views to FIGS. 3 to 6 respectively, illustrating the sorting table with sorter rolls in operation.

FIG. 13 is a front elevation view of an example of production of a gearbox allowing the drive, in the same rotating direction, of the roll assembly of the sorting table.

FIG. 14 is a sectional view along the line 14-14 of FIG. 13.

FIGS. 15A and 15B illustrate perspective views of the coupling devices of the rotating rolls to the axis of the drive gears of the gearbox.

FIGS. 16A to 16D represent schematic views of an example of production of the detachable assembly of the rolls.

FIG. 21 is a partial rear elevation view of a grape-picking machine, illustrating the retraction of the upstream part of the sorting table to allow conserving a certain volume of stalks of the grape and leaves in the crop dumped into the bins.

DETAILED DESCRIPTION OF THE INVENTION

Figure 12:
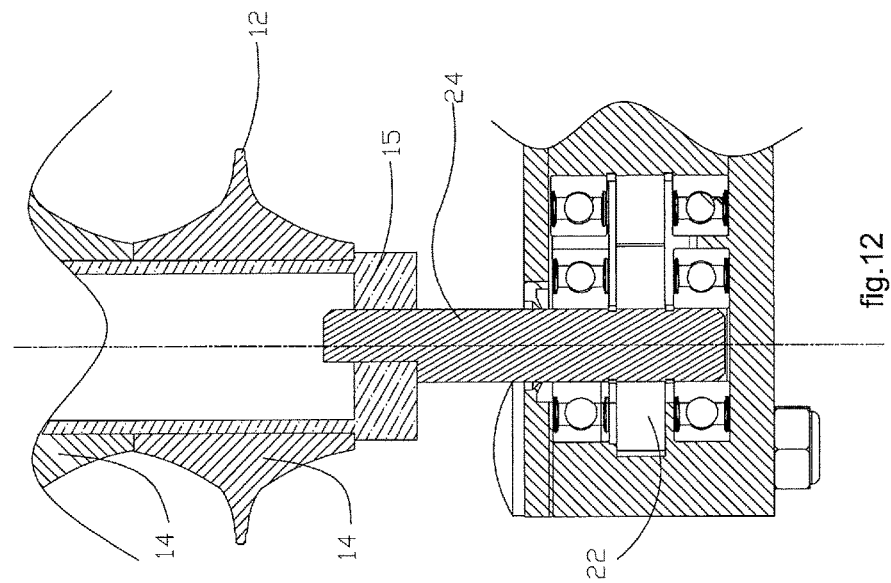
FIG. 12 is an axial section view illustrating the rollers in the coupled position.
Figure 11:
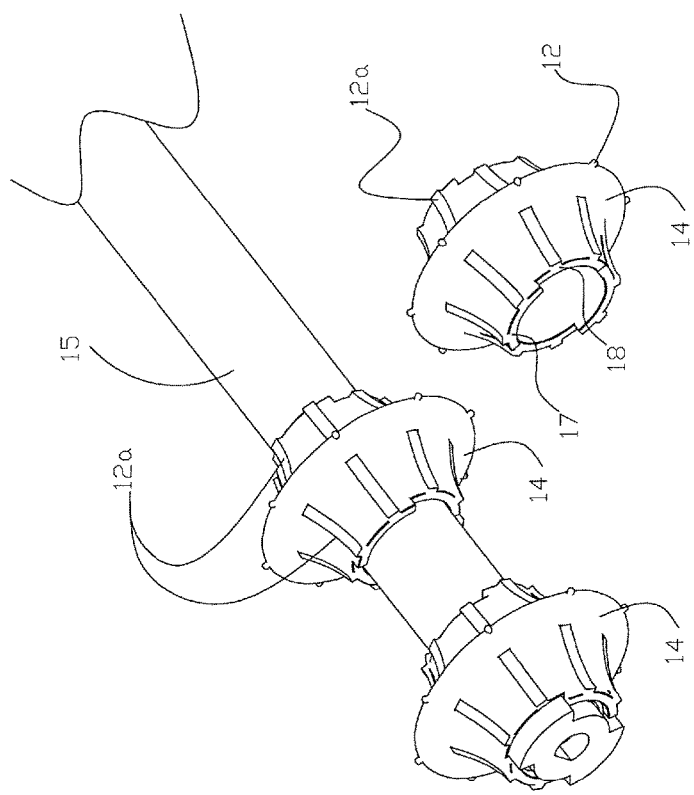
FIG. 11 is a detailed exploded perspective view showing more specifically the roller coupling devices.
Figure 17:
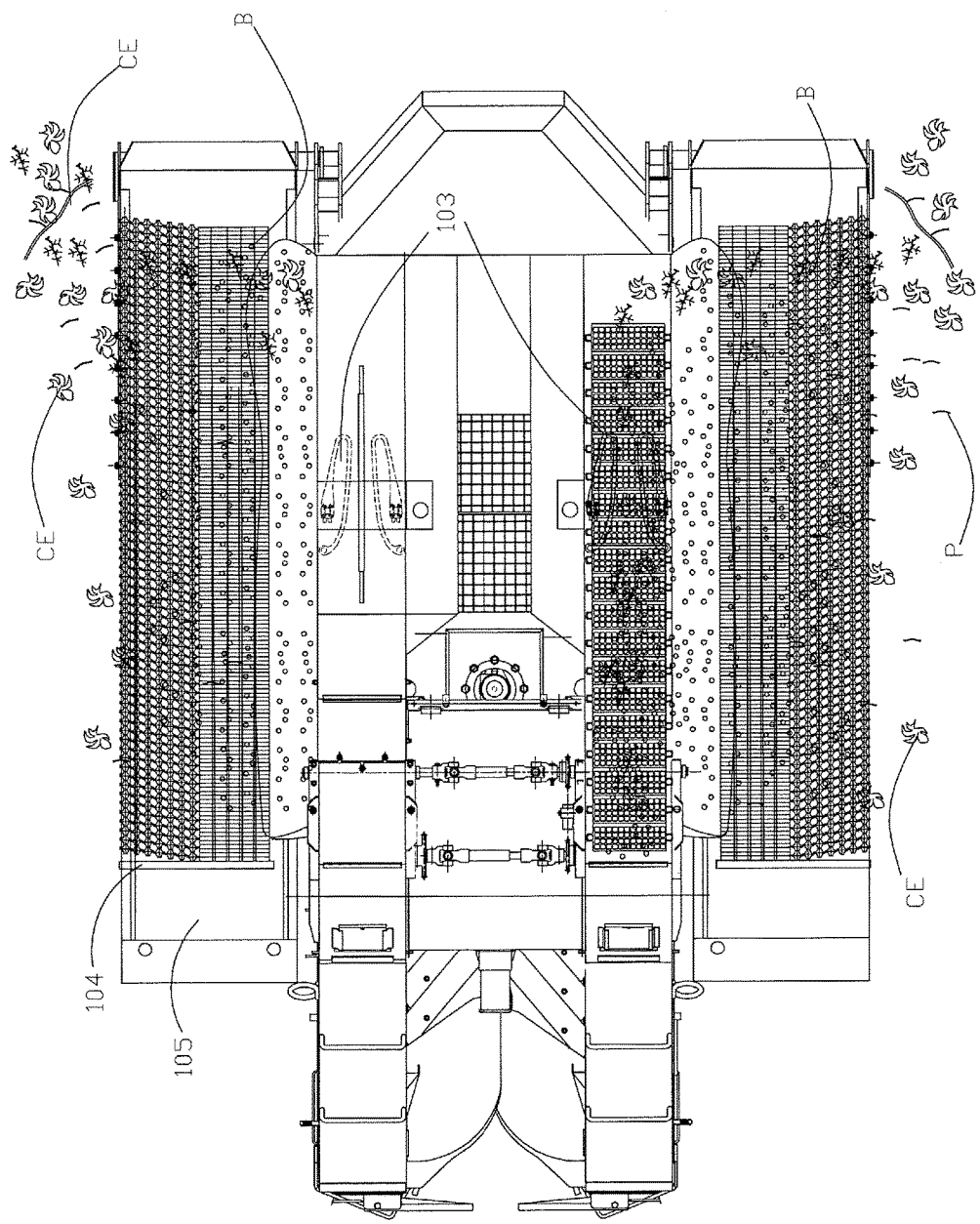
FIG. 17 is a top plan view of a grape-picker equipped with two sorting tables installed above its receiving bins.
Figure 18:
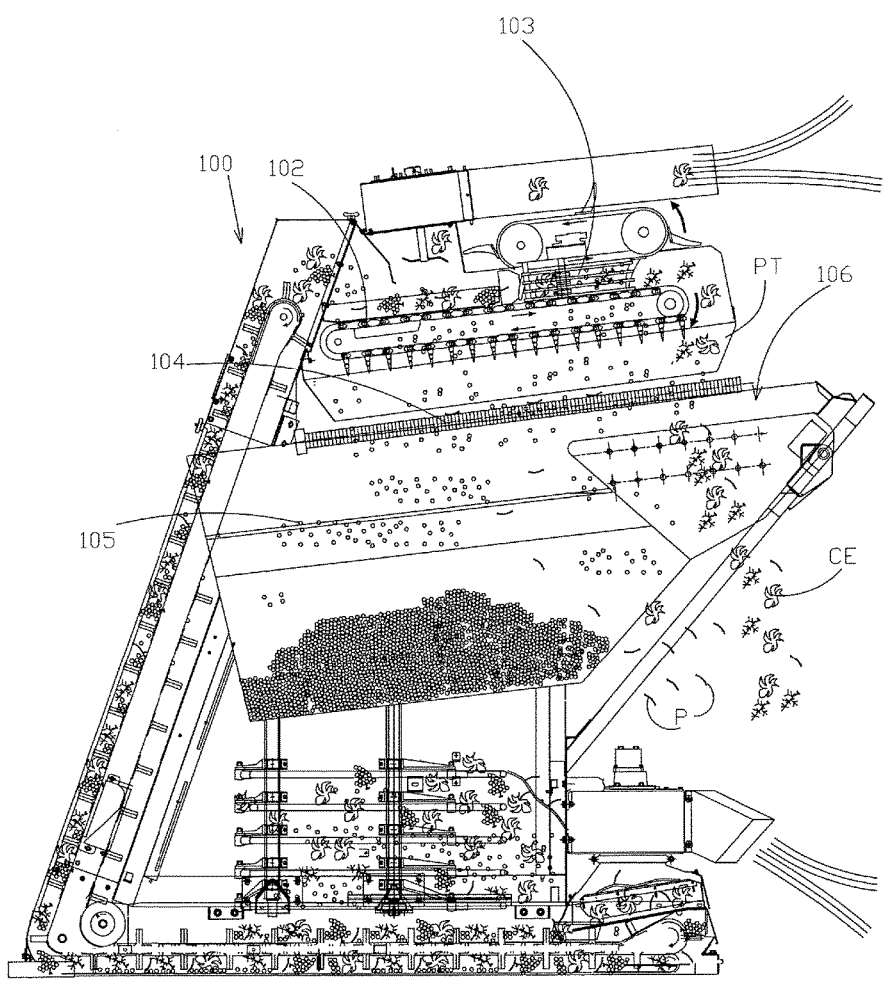
FIGS. 18 and 19 are, respectively, side and rear elevation views of this machine.
Figure 19:
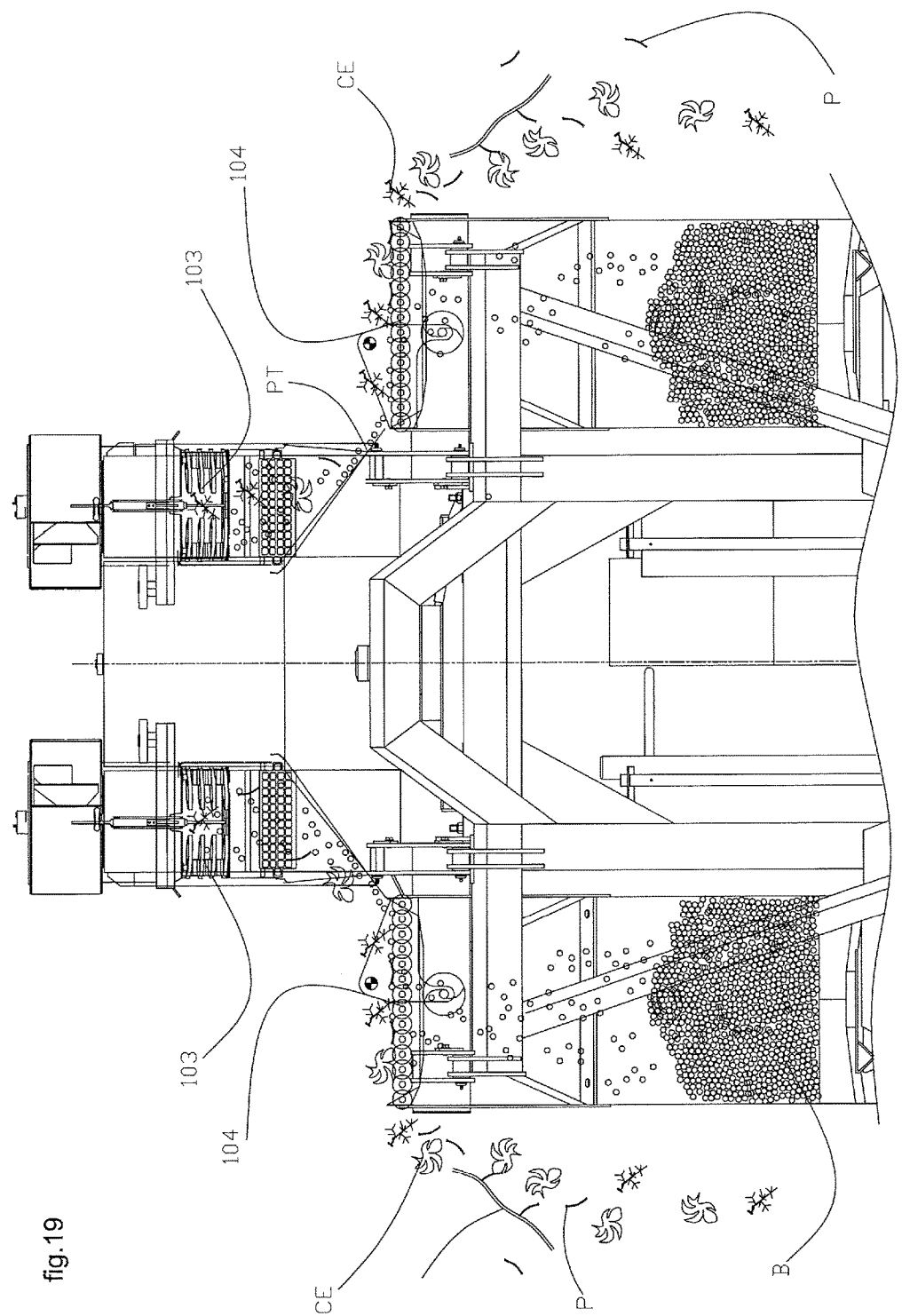

Said drawings are referred to in order to describe interesting, although by no means limiting, examples of execution of the sorting table with sorter rolls according to the invention, as well as a grape-picking machine including such sorting tables.

According to the way of carrying out the invention illustrated in FIGS. 1B, 2B and 3 to 10, the sorter system of the sorting table is constituted by a succession of adjacent rotating rolls of a generally cylindrical shape 1, 2, arranged in parallel, so as to form a sorting plane with an upstream part 3 and a downstream part 4. The rolls 1, 2 are driven in rotation in the same direction by the means described hereafter, and they are separated by gaps 5 (rolls 1) or by openings 6 (rolls 2). According to a characteristic device of the invention, they are immobilized in translation.

These rotating rolls are fitted and arranged so as to allow, at the beginning and in the upstream part of the sorting plane (rolls 1), the passage and dropping of foreign matter of a size smaller than that of only small fruit, and then the passage and dropping of only small fruit, in the remaining part or the downstream part of said sorting plane (rolls 2). Foreign matter of a size larger than small fruit remaining at the surface of the mobile sorting plane and being evacuated at its downstream end.

In the description and the claims relative to the mode of production shown in FIGS. 1B, 2B and 3 to 10, the rolls 1 constituting the upstream part 3 of the sorting plane are called "feeder cleaner rolls" on account of their dual function which is to direct the waste of elongate shape perpendicularly to the rational axis of said rolls to transport them, in this position to the roll assembly 2, while allowing the evacuation of small debris and waste. The rolls 2 constituting the downstream part 4 of said sorting plane are called "sorter rolls" on account of their function which is to separate the berries from the foreign matter that has to be eliminated.

According to this mode of execution, the rotating feeder cleaner rolls 1 constituting the upstream part 3 of the sorter plane include a succession of circular reliefs 7 separated by circular grooves 8 and are positioned so that the circular grooves of these rolls are imbricated in the circular grooves 8 of the adjacent roll or rolls, a gap or play 5 of reduced size being placed between the parts that interpenetrate with the neighboring rolls. This gap presents, for example, a width in the order of 2 to 3 mm, so as to let pass only the debris and waste of very small size (pips, small mineral or plant debris, etc.).

FIGS. 3 and 4 show the gap or play 5 in the form of a baffle located between two neighboring feeder cleaner rolls 1.

On the other hand, the rotating sorter rolls 2, constituting the remaining part or downstream part of the sorting plane also present a succession of circular reliefs 9 separated by circular grooves 10. These circular reliefs have a median circular crest or ridge connecting at the root of the grooves by a concave, preferably arc-shaped surface. The rolls are positioned so that their circular grooves, together with the grooves of the neighboring roll or rolls, form a number of openings 6 of round or approximately round and dimensioned to allow the passage of only the small fruit to be sorted.

FIGS. 3 and 4 show the openings 6 made between two adjacent sorter rolls 2. These openings have different dimensions on said figures, these figures being chosen depending on the size of the berries or other small fruit to be processed.

According to a preferred mode of execution, the circular reliefs 9 of each sorter roll 2 are slightly offset in relation to the circular reliefs 9 of the adjacent circular roll or rolls and their adjacent tapered edges are engaged in the grooves 10 of the adjacent roll or rolls while allowing the formation of openings 6, as shown particularly on FIGS. 3 and 4.

According to another important characteristic arrangement, the circular reliefs 7, 9 of the cleaner rolls 1 and of the sorter rolls 2 are peripherally equipped with stubs, notches or humps 11, 12, respectively, that are angularly spaced.

These stubs, or notches or humps contribute greatly to ensuring the proper orientation and the proper routing of foreign matter above the sorter plane, all the way to the downstream end for its ejection.

On the other hand, according to another interesting arrangement, the circular grooves 10 of the sorter rolls 2 are provided with angularly spaced flutes 12*a* (FIG. 15A).

In this way, the crop products dumped on the upstream part 3 of the sorting table are shaking as they travel in the direction of the dumping end of the latter, and this shake favors their passing from one roll to another and ensures that foreign matter is kept above the sorting plane, while the berries pass through the openings in it.

Thanks to the arrangement described above, when the crop is dumped, after the destalking, on the upstream part 3 of the sorting plane, for example by sliding on an inclined plane or deflector D, it is at first transported in the direction of the downstream part of it, by the feeder cleaner rolls 1. During this first phase, small foreign matter P (pips, plant and mineral debris, . . . ) and the juice pass through the gaps 5 and drop into an open-worked tray 16 (FIGS. 9 and 10) positioned below said rolls and allowing recovery of the juice. Debris of elongated shape PT (leaf stalks, twigs, pieces of tendrils, . . . ) is oriented perpendicularly to the axis of the rolls 1 and 2 as soon as it comes into contact with the rolls and is conveyed in this position with the grapes thus freed of its small foreign matter, in the direction of the sorting rolls 2. During this second phase, the grape berries B pass through the openings 6 made between the sorting rolls 2 and are recovered in a bin (if the sorting table is mounted on a grape-picking machine) or into a grape pump (if the sorting table is installed in a fixed position) placed under the sorting rolls 2. Foreign matter CE such as leaves, tendrils or stalks of the grape etc. "float" on the sorting rolls 2 and are conveyed to the downstream end of the sorting table where they are ejected by the latter.

According to another characteristic arrangement the circular reliefs 7, 9 and the circular grooves 8, 10 of the cleaner rolls 1 and of the sorting rolls 2 are formed by a succession of rollers 13, 14 including a circular relief 7, 8 and a half-groove 8, 10 placed on each side of said circular relief, so that the circular grooves 8, 10 are formed by the association of two adjacent rollers.

According to a preferred mode of execution, the rollers 13, 14 are simply thread on a bar 15 and are coupled together in rotation among themselves by means of notches 17. The rollers are equipped with complementary lateral arc-shaped slots 18 laterally, being immobilized in translation on said bar.

This layout is shown in FIGS. 11, 12, 15A and 15B, with respect to the rollers 14 of only the sorting rolls 2, considering that the rollers 13 of the cleaner feeder rolls 1 are provided with identical mounting and coupling means.

Putting the assembly of rolls 1, 2 of the sorting table into rotation in the same direction can be achieved by means of a drive system that includes an in-line gearbox 19, shown in FIGS. 13 and 14. This gearbox is coupled to a drive motor 20, for example, through the intermediary of an elastic coupling 21. It consists essentially of a cluster or succession of gears 22 between which intermediary gears 23 are interposed.

Each drive gear 22 of this gearbox 19 is integral with an axis 24 through the intermediary of which it can be removably coupled with a bar 15. Each bar 15 is equipped, in one of its terminal parts, with a jaw clutch 25 through the intermediary of which it is assembled in rotation, removably, to roller 13 or 14 placed at the end of an alignment of rollers 13 or 14 coupled in rotation among themselves. The cluster gear 22-23 is driven in rotation by a drive gear 19*a* which is itself driven by the motor 20. The drive pins 24 of the gears 22 include a flat 24*a* engaged in an axial hole 25*a* of complementary shape which presents the jaw clutch 25.

It is of course possible to achieve the rotating drive of the rolls 1 and 2, in other ways than through the intermediary of a gear, for example by means of a chain or a belt, either notched or not.

The opposite terminal portion of each shaft 15 is provided with a means, such as, for example, a system of screw nut and counter-nut screwed on a threading of said terminal portion, allowing to push the rollers 13, 14 against each other, in coupled position, so as to resist any axial movement and decoupling of said rollers.

The feeder cleaner rolls 1 and the sorter rolls 2 are mounted so they are removable and interchangeable on the bearing structure of the sorting table, this arrangement being particularly interesting as far as the installation of the sorter rolls is concerned. In fact, the quickly removable fastening of the latter, to replace them with rollers allowing to create openings 6 of different size, enables the sorting of fruit of different size, either according to the size of the berries, or to obtain berries sorted according to progressive size.

An example of execution of the removable installation of rolls 1 and 2 is shown in FIGS. 16A to 16D, this installation being shown with reference to the sorter rolls only, since it can be identical for the feeder cleaner rolls 1.

According to this example, the side 27A of the bearing structure, as opposed to side 27B of it which supports the gearbox 19, bears a number of retractable axes 28 which are engaged in a bore 29 which represents the end of the bars 15. These retractable axes 29 are subjected to the action of an elastic feature which tends to push them back into the coupling position. This elastic feature is for example in the form of a helicoidal spring 30 acting in compression positioned around the axis 28 and jammed between a washer 31 attached to the internal portion of said axis and the side 27B of the bearing structure.

FIG. 16B shows two rolls 2a, 2b in installed position on the side 27A of the bearing structure. FIGS. 16C and 16D show the retraction of the retractable axis 28 from the end of roll 2a, in opposition to the counteraction of the spring 30, and FIG. 16F shows the removal of this roll.

The invention covers also the small-fruit picking machines and more specifically the grape-picking machines with a sorting table with rolls presenting the previously described characteristics.

According to a preferred mode of execution that is applicable to harvesting machines equipped with one or several receiving bins for small fruit and berries, a sorting table with rolls is positioned above the upper opening of said receiving bin(s).

FIGS. 17 to 21 show a grape-picking machine 100 featuring on both sides of its median longitudinal work plane, a belt conveyor 101 for dumping the raw grapes onto an open-worked conveyor belt 102, for example of the type described in French patent 2 795 599, allowing the extraction of the juice and the destalked berries and above the downstream part of which a stalk separator 103 is installed. A sorting table with rolls according to the invention, designated in its entirety by the reference 104 and featuring the technical characteristics described above, is positioned above the upper opening 106 of the receiving bins 105. The berries B detached from the stalks by the stalk separator 103 and the juice pass into the openings 6 of the sorting table and are received in the subjacent bin 105 whereas all foreign matter CE (stalks, leaves, pieces of tendrils and others) are rejected onto the sides of the machine.

Figure 20:
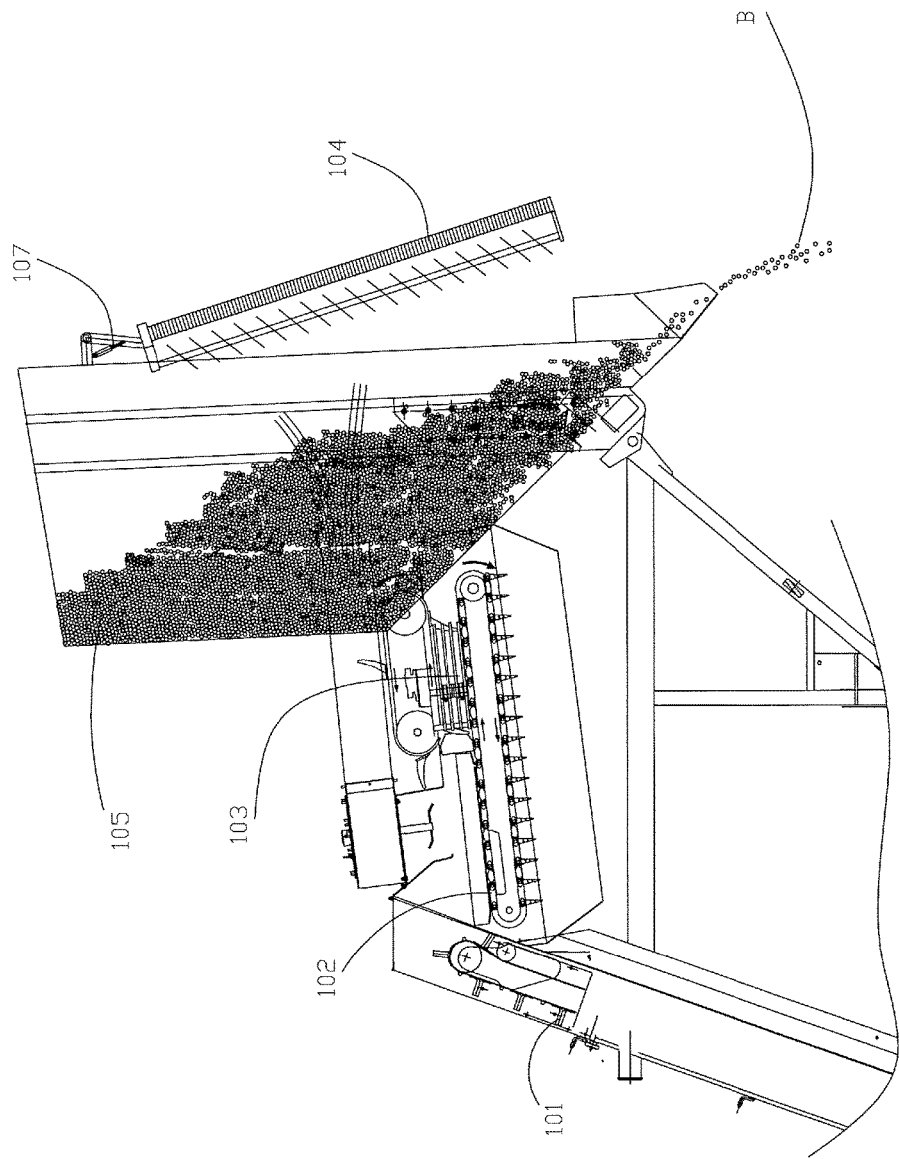
FIG. 20 is a partial side elevation view of a grape-picking machine illustrating the emptying of a bin.

According to an advantageous mode of execution, the sorting tables 104 are tiltably installed, through the intermediary of one of their sides, on the receiving bins 105, so the upper opening 106 of said bins can be laid free and the latter can be emptied (FIG. 20). This tilting action may be obtained by a convenient motorized system, for example by the installation of a gas-filled lifting jack 107.

According to another interesting version, the sorting table 104 is made of two parts 104A, 104B, with one (104A) of its parts being installed as tiltable against the other (104B) so that when said sorting table is installed above the upper opening 106 of a receiving bin 105, it can be tilted in retracted position, so as to allow the direct dumping into said bin of grape berries together with leaves and stalks, when the nature of the grape varieties and the vinification methods make their non-separation desirable.

We claim:

1. A sorting system for removing foreign matter mixed with small fruit, the sorting system comprising:

a plurality of cylindrical rolls arranged in parallel relation adjacent to each other, said plurality of cylindrical rolls defining a sorting plane;

a driver drivingly connected to said plurality of cylindrical rolls so as to rotate said plurality of cylindrical rolls in a common direction so as to allow the mixture of the foreign matter and small fruit to be transported along said sorting plane over an entire length of said sorting plane in a direction perpendicular to an axis of rotation of said plurality of cylindrical rolls, said plurality of cylindrical rolls being immobilized in translation, and plurality of cylindrical rolls being fitted together so as to define a number of openings between adjacent cylindrical rolls of said plurality of cylindrical rolls, each of the number of openings is adapted to allow for a passage and a dropping of only the small fruit while foreign matter that has a size larger than a size of the small fruit remains on a surface of said sorting plane such that the foreign matter on said sorting plane is discharged at a downstream end of said sorting plane, said plurality of cylindrical rolls having a succession of circular reliefs separated by circular grooves, the circular reliefs having a median circular crest joined directly to each other at a bottom of the circular grooves by a concave arc-shaped surface such that each of said plurality of cylindrical rolls includes a plurality of circular reliefs and a plurality of half-grooves each formed by one of the concave arc-shaped surfaces on each side of each circular relief of the cylindrical roll, the concave arc-shaped surfaces having a continuous curvature between adjacent median circular crests, the succession of median circular crests and the concave arc-shaped surfaces joining the median circular crests being arranged in a direction parallel to the axis of rotation of the cylindrical roll, the median circular crest concentrically extending around the axis of rotation of the cylindrical roll, said plurality of cylindrical rolls being positioned such that the circular grooves of one of said plurality of cylindrical rolls forms said number of openings with the circular grooves of the adjacent cylindrical roll, the circular reliefs of the one of said plurality of cylindrical rolls being slightly offset relative to the circular relief of the adjacent cylindrical roll, the circular reliefs of one of said plurality of cylindrical rolls having an outer edge partially engaged in the circular grooves of the adjacent cylindrical roll so as to define the size of the openings, the circular reliefs having spaced stubs or notches or humps formed on a periphery thereof; and a succession of rotating feeder-cleaner rolls each having a cylindrical shape, said succession of rotating feeder-cleaner rolls being in parallel relation upstream of said plurality of cylindrical rolls, said succession of rotating feeder-cleaner rolls being rotatable in a same direction as the direction of rotation of said plurality of cylindrical rolls, each feeder-cleaner roll of said succession of rotating feeder-cleaner rolls having circular reliefs separated by circular grooves, said succession of rotating feeder-cleaner rolls being immobilized in translation and positioned such that the circular reliefs of one of the feeder-cleaner rolls are imbricated in the circular groove of an adjacent feeder-cleaner roll so as to define a gap therebetween, said gap having a size smaller than the size of the opening so as to allow for passing therethrough of the foreign matter.

2. The sorting system of claim 1, the circular reliefs of the feeder-cleaner rolls having a spaced stubs or notches or humps formed on a periphery thereof.

3. The sorting system of claim 1, further comprising:
a table having a bearing structure thereon, said plurality of cylindrical rolls removably and interchangeably mounted in said bearing structure.

4. The sorting system of claim 1, the circular reliefs and the circular grooves comprising rollers successively threaded on a support bar.

5. The sorting system of claim 4, the cylindrical rolls being removably and interchangeably mounted on said support bar.

6. The sorting system of claim 5, the cylindrical rolls being threadedly affixed to said support bar, said plurality of cylindrical rolls being coupled in rotation to each other by notches and complementary lateral arc-shaped slots.

7. The sorting system of claim 5, said support bar having an end with an axle mounted in an axial bore in said end, said axle being axially mobile and engaged in a retractable manner in said axial bore, said axial bore having a spring therein, said spring urging on said axle so as to keep said axle in said axial bore.

8. The sorting system of claim 3, further comprising:
at least one receiving bin, said table positioned above an upper opening of the receiving bin.

9. The sorting system of claim 8, said table being tiltable in relation to said upper opening of the receiving bin.

10. The sorting system of claim 8, said table having an upstream part and a downstream part, one of said upstream part and said downstream part being tiltably mounted so as to allow retraction and access to said upper opening of the receiving bin.

* * * * *